(12) United States Patent
Benson et al.

(10) Patent No.: US 9,318,991 B2
(45) Date of Patent: *Apr. 19, 2016

(54) ELECTRIC MOTOR FREQUENCY MODULATION SYSTEM

(71) Applicant: The Boeing Company, Chicago, IL (US)

(72) Inventors: Christopher Pete Benson, Renton, WA (US); Douglas C. Cameron, Ladera Ranch, CA (US); Peng Zeng, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 275 days.

This patent is subject to a terminal disclaimer.

(21) Appl. No.: 13/860,720

(22) Filed: Apr. 11, 2013

(65) Prior Publication Data
US 2014/0306628 A1 Oct. 16, 2014

(51) Int. Cl.
H02P 1/04 (2006.01)
H02P 27/04 (2006.01)
H02P 29/02 (2006.01)

(52) U.S. Cl.
CPC .............. *H02P 27/04* (2013.01); *H02P 29/02* (2013.01)

(58) Field of Classification Search
CPC .............. H02P 6/08; H02P 29/02; H02K 7/14
USPC .......................................... 318/799, 801, 461
See application file for complete search history.

(56) References Cited

U.S. PATENT DOCUMENTS

| 4,467,258 | A  | * | 8/1984 | Leuthen .................... 318/800 |
| 4,965,513 | A  |   | 10/1990 | Haynes et al. |
| 5,296,789 | A  | * | 3/1994 | Ohi ....................... 318/400.08 |
| 6,041,287 | A  |   | 3/2000 | Dister et al. |
| 6,175,210 | B1 | * | 1/2001 | Schwartz et al. ............. 318/801 |
| 6,707,827 | B1 | * | 3/2004 | Shaffer et al. ................. 370/493 |
| 7,035,064 | B2 | * | 4/2006 | Schimanek et al. ........... 361/23 |
| 7,230,358 | B2 | * | 6/2007 | Smith .......................... 310/114 |
| 7,515,447 | B2 | * | 4/2009 | Ronkainen ............... G01K 7/01 363/141 |
| 2005/0007096 | A1 |   | 1/2005 | Dimino et al. |
| 2007/0175429 | A1 |   | 8/2007 | Yanagida et al. |
| 2009/0322273 | A1 | * | 12/2009 | Kallioniemi et al. ......... 318/503 |
| 2010/0007300 | A1 | * | 1/2010 | Hein ................... H02P 29/0088 318/503 |
| 2010/0013419 | A1 |   | 1/2010 | White |
| 2010/0123439 | A1 | * | 5/2010 | Steele, Jr. ................. H02P 9/48 322/24 |
| 2011/0076037 | A1 | * | 3/2011 | Fukushi ......................... 399/33 |
| 2011/0080131 | A1 |   | 4/2011 | Shimada et al. |
| 2011/0080762 | A1 |   | 4/2011 | Nikolov |
| 2011/0193506 | A1 | * | 8/2011 | Hayashi et al. .......... 318/400.12 |
| 2013/0026955 | A1 |   | 1/2013 | Kikunaga et al. |
| 2013/0057061 | A1 |   | 3/2013 | Shiomi et al. |
| 2013/0119902 | A1 |   | 5/2013 | Gries et al. |

OTHER PUBLICATIONS

"Calculations" [online] First published 1999 [Retrieved Mar. 18, 2015] Retrieved from the Internet www.simplemotor.com/calculations/ pp. 1-4.*

(Continued)

*Primary Examiner* — Rina Duda
(74) *Attorney, Agent, or Firm* — Yee & Associates, P.C.

(57) ABSTRACT

A method and apparatus for controlling an electric motor. A switching frequency meeting a desired operating condition is identified from information relating to operation of the electric motor. A switching of a current supplied to the electric motor with the switching frequency identified is controlled.

20 Claims, 8 Drawing Sheets

(56) References Cited

OTHER PUBLICATIONS

Cameron, Jr., "Current Control in Brushless DC Motors," U.S. Appl. No. 13/303,673, filed Nov. 23, 2011, 43 pages.

"Speed Software," CD-Adapco, 4 pages, accessed Nov. 15, 2011, http://www.speedlab.co.uk/software.html.

"TG100H BLDC Inductor Board," ThinGap Corporation, copyright 2001-2004, 1 page, accessed Nov. 15, 2011, http://www.thingap.com/pdf/2011/tg100hbldcindboard.pdf.

Bensen et al., "Electric Motor Signature Reduction System," U.S. Appl. No. 14/034,964, filed Sep. 24, 2013, 63 pages.

Mohammed, "Electromagnetic Signature Modeling and Measurement of Multi-Component Ship Power Systems," Florida International University, Proposal for Funding submitted to Office of Naval Research, Aug. 2012, 17 pages.

Office Action, dated Apr. 2, 2015, regarding U.S. Appl. No. 14/034,964, 21 pages.

Final Office Action, dated Sep. 1, 2015, regarding U.S. Appl. No. 14/034,964, 28 pages.

* cited by examiner

| OPERATING PARAMETERS 513 | CONSTRAINT 514 | ACTION 516 |
|---|---|---|
| 502 — MAXIMUM STATOR TEMPERATURE | MAXIMUM STATOR TEMPERATURE HAS BEEN EXCEEDED | SET THE SWITCHING FREQUENCY TO ABOUT 40 kHz |
| 504 — MAXIMUM STATOR TEMPERATURE INCREASE RATE MAXIMUM STATOR TEMPERATURE | MAXIMUM STATOR TEMPERATURE INCREASE RATE HAS BEEN EXCEEDED AND MAXIMUM STATOR TEMPERATURE IS AT LEAST 90% | SET THE SWITCHING FREQUENCY TO ABOUT 40 kHz |
| 506 — MAXIMUM CONTROLLER TEMPERATURE | MAXIMUM CONTROLLER TEMPERATURE HAS BEEN EXCEEDED | SET THE SWITCHING FREQUENCY TO ABOUT 20 kHz |
| 508 — MAXIMUM CONTROLLER TEMPERATURE INCREASE RATE MAXIMUM CONTROLLER TEMPERATURE | MAXIMUM CONTROLLER TEMPERATURE INCREASE RATE HAS BEEN EXCEEDED AND MAXIMUM CONTROLLER TEMPERATURE IS AT LEAST 90% | SET THE SWITCHING FREQUENCY TO ABOUT 20 kHz |

FIG. 5

| OPERATING PARAMETERS | CONSTRAINT | ACTION |
|---|---|---|
| REVOLUTIONS PER MINUTE (RPM) | RPM INCREASES/DECREASES BY 10% SINCE LAST SWEEP | FREQUENCY SWEEP |
| TORQUE | TORQUE INCREASES/DECREASES BY 10% SINCE LAST SWEEP | FREQUENCY SWEEP |

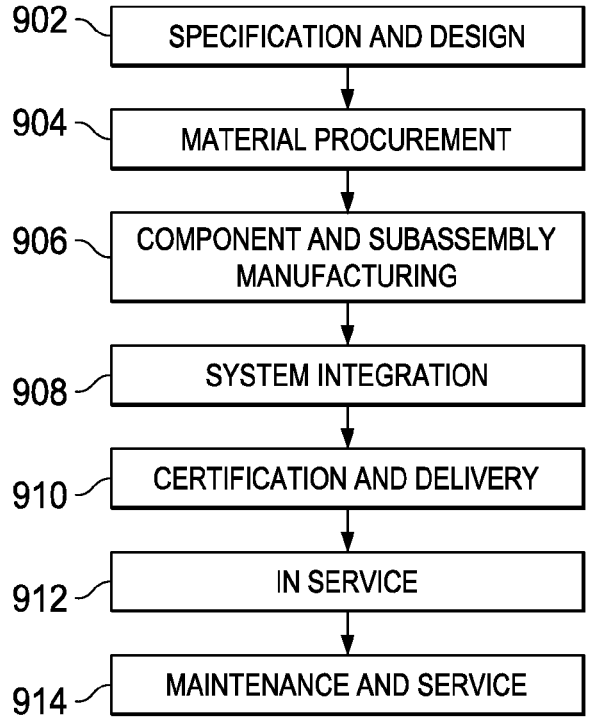
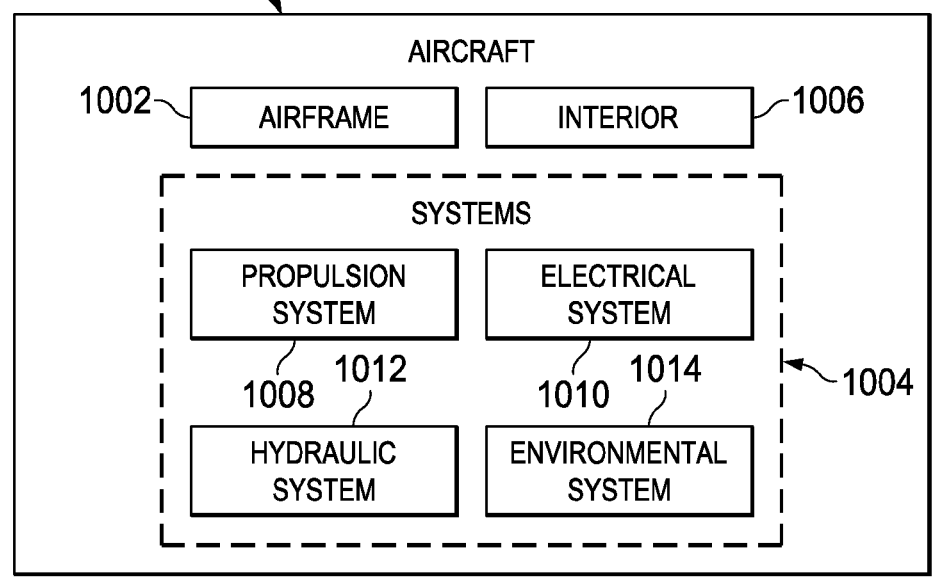

ELECTRIC MOTOR FREQUENCY MODULATION SYSTEM

BACKGROUND INFORMATION

1. Field

The present disclosure relates generally to electric motor systems and, in particular, to controlling electric motor systems. Still more particularly, the present disclosure relates to a method and apparatus for controlling the switching frequency at which the motor controller supplies current to an electric motor.

2. Background

An electric motor is a device that converts electrical power into mechanical power. Electric motors are used for various applications. These applications include fans, pumps, tools, disk drives, drills, and other types of devices that may be found in these and other types of platforms.

An electric brushless motor is a commonly used type of electric motor. With electric brushless motors, a controller is configured to change the current in windings in the electric motor. In particular, the current is switched at a frequency that changes the amplitude of the current applied to the windings in phases in a manner that causes the motor to turn. The switching of the current is performed using switches in the form of transistors.

With respect to the performance and durability of brushless electric motors, heat is a limitation. Heat may weaken magnets, cause undesired inconsistencies in the installation of the windings, and other undesirable effects. Further, the operating environment also may expose the electric motor to more heat than desired.

As a result, the electric motor may have a lower than desired lifespan. Additionally, the electric motor may not perform as desired. This situation may result in maintenance, replacement, or both that may occur sooner or more often than desired.

Additionally, the heat generated by the electric motor also may have undesirable effects on other devices that may be in the vicinity of the electric motor. For example, the heat generated by the electric motor may cause these other devices not to perform as desired.

Currently, heat generated by electric motors may be managed through cooling systems. The cooling systems may include fans, liquid cooling devices, and other suitable systems that may dissipate heat from the electric motor.

The use of the cooling system, however, increases the expense of the electric motor. Further, the cooling system also uses space and increases the weight of an electric motor system. Further, use of active cooling systems may reduce the efficiency of the electric motor system. Additionally, in some cases, the amount of space available for the increase in weight may make the use of a cooling system undesirable or impossible.

Therefore, it would be desirable to have a method and apparatus that takes into account at least some of the issues discussed above, as well as other possible issues.

SUMMARY

An embodiment of the present disclosure provides an apparatus comprising a controller. The controller is configured to identify a switching frequency meeting a desired operating condition from information relating to operation of an electric motor. The controller is further configured to control switching of a current supplied to the electric motor with the switching frequency identified.

Another illustrative embodiment of the present disclosure provides an electric motor system comprising an electric motor and a controller. The controller is configured to receive information relating to heat generated by an operation of the electric motor. The controller is also configured to identify a switching frequency meeting a desired operating temperature from the information relating to the heat generated by the operation of the electric motor. The controller is further configured to control switching of a current supplied to the electric motor with the switching frequency identified.

Yet another illustrative embodiment provides a method for controlling an electric motor. A switching frequency meeting a desired operating condition is identified from information relating to operation of the electric motor. A switching of a current supplied to the electric motor with the switching frequency identified is controlled.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 is an illustration of a table of rules for handling operating parameters in accordance with an illustrative embodiment;

FIG. 9 is an illustration of an aircraft manufacturing and service method in the form of a block diagram in accordance with an illustrative embodiment; and FIG. 10 is an illustration of an aircraft in the form of a block diagram in which an illustrative embodiment may be implemented.

DETAILED DESCRIPTION

The illustrative embodiments recognize and take into account one or more different considerations. For example, the illustrative embodiments recognize and take into account that the amount of heat generated by an electric motor may depend on the frequency at which current is switched to the electric motor. The illustrative embodiments recognize and take into account that currently used electric motors have controllers that use a fixed switching frequency. In other words, the frequency at which transistors operate or switch is held constant and typically defined by the operating limits of the controller.

The illustrative embodiments recognize and take into account that changing the switching frequency in response to operating conditions of the electric motor or the environment around the electric motor may be used to increase the efficiency of the electric motor system in which the electric motor is located. For example, the illustrative embodiments recognize and take into account that changing the frequency in response to operating conditions of the motor or the environment around the electric motor may reduce the heat generated by the electric motor.

Further, the illustrative embodiments recognize and take into account that the switching frequency may be changed to increase the efficiency of the electric motor system as a whole. The illustrative embodiments also recognize and take into account that the switching frequency may be changed to decrease the heat generated by different components in the electric motor system. These components may include, for example, a controller, the electric motor, and other suitable components.

The illustrative embodiments recognize and take into account that the switching frequency for increasing the overall efficiency of the electric motor system and the switching frequency for reducing the heat generated by one or more components in the electric motor system may be the same frequency in some cases. In other cases, different switching frequencies may be selected, depending on the goal.

Thus, the illustrative embodiments provide a method and apparatus for controlling an electric motor. A switching frequency meeting a desired operating condition is identified from information relating to operation of the electric motor. The switching of the current supplied to the electric motor is controlled with the switching frequency identified. This type of changing of the switching frequency may be performed dynamically during the operation of the motor.

Figure 1:
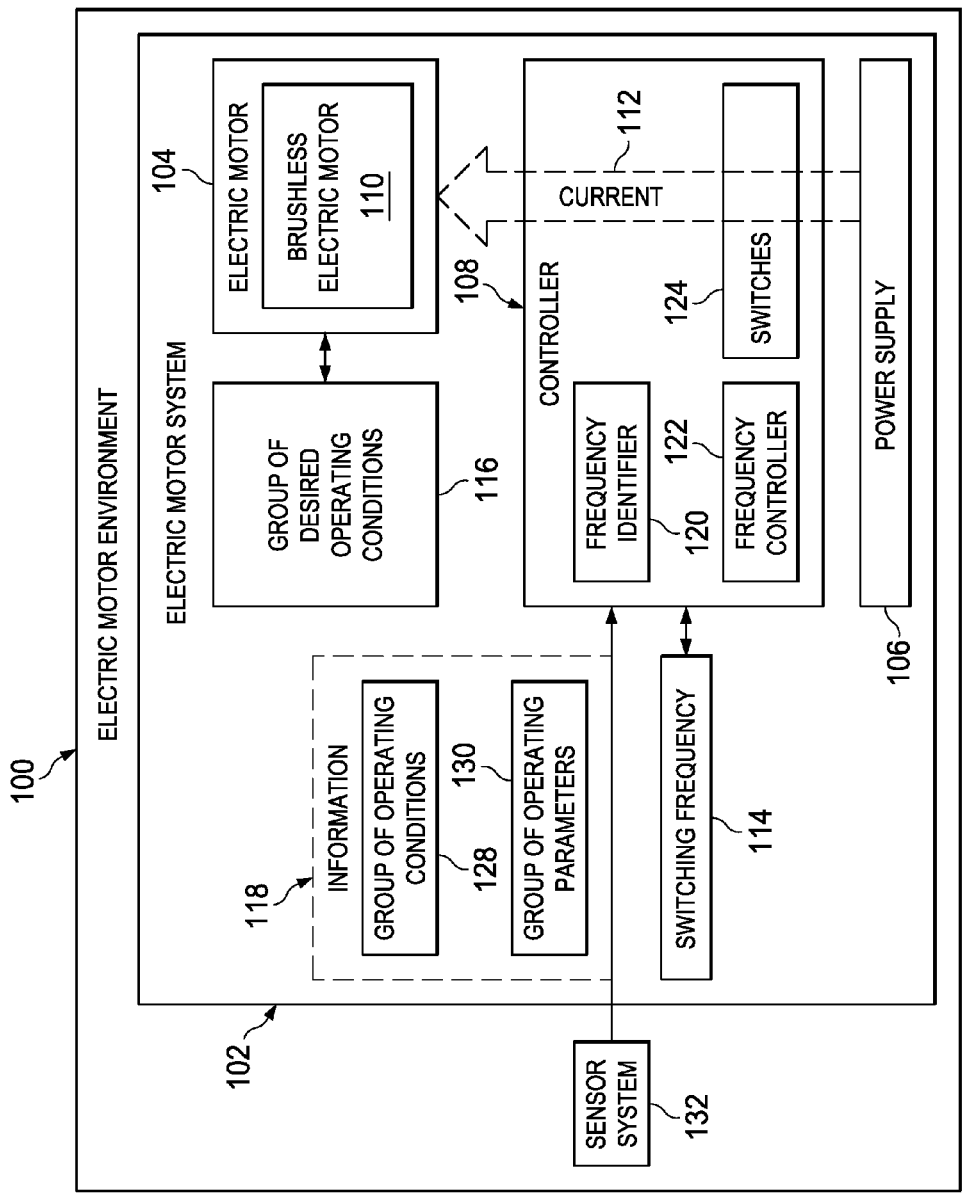
FIG. 1 is an illustration of a block diagram of an electric motor environment in accordance with an illustrative embodiment.

With reference now to the figures and, in particular, to FIG. 1, an illustration of a block diagram of an electric motor environment is depicted in accordance with an illustrative embodiment. Electric motor environment 100 is an example of an environment in which an illustrative embodiment may be implemented.

Electric motor system 102 in electric motor environment 100 includes a number of different components. As depicted, electric motor system 102 includes electric motor 104, power supply 106, and controller 108.

Electric motor 104 is configured to generate rotary or linear torque or force. In these illustrative examples, electric motor 104 takes the form of brushless electric motor 110.

Power supply 106 supplies current 112 to electric motor 104 through controller 108. Power supply 106 may take various forms. For example, power supply 106 may be selected from at least one of a battery, a power supply unit that converts alternating current to direct current, an electric generator, or some other suitable component.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A, one of item B, and ten of item C; four of item B and seven of item C; and other suitable combinations. The item may be a particular object, thing, or a category. In other words, at least one of means any combination of items and number of items may be used from the list but not all of the items in the list are required.

Controller 108 is a hardware device in these illustrative examples. Controller 108 may include software. The hardware may include circuits that operate to perform the operations in controller 108.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

In this illustrative example, controller 108 may be configured to identify switching frequency 114 meeting group of desired operating conditions 116. "A group of," as used herein with reference to an item, means one or more items. For example, group of desired operating conditions 116 is one or more desired operating conditions. In the illustrative example, group of desired operating conditions 116 may be selected from at least one of efficiency, power, or other desirable operating conditions. In these illustrative examples, the efficiency may be the efficiency of electric motor system 102. This efficiency may be based on reducing heat generated by at least one of electric motor 104 or controller 108. The power may be power or torque generated by electric motor system 102.

Switching frequency 114 is identified from information 118 relating to the operation of electric motor 104. Controller 108 controls the switching of current 112 to electric motor 104 with switching frequency 114.

In this illustrative example, controller 108 may be comprised of a number of different components. For example, controller 108 may include frequency identifier 120, frequency controller 122, and switches 124.

As depicted, frequency identifier 120 may receive information 118. Information 118 relating to the operation of electric motor 104 includes various types of information. Information 118 may include any information about the operation of electric motor 104, controller 108, power supply 106, and other conditions in electric motor environment 100. For example, information about other devices or components around electric motor 104 in electric motor environment 100 may be considered.

In these illustrative examples, information 118 may include group of operating conditions 128. In this illustrative example, group of operating conditions 128 are operating conditions that are detected or sensed in electric motor environment 100 as opposed to desired conditions in group of desired operating conditions 116. Additionally, information 118 also may include group of operating parameters 130. In these illustrative examples, group of operating parameters 130 may be selected from one or more of group of desired operating conditions 116. An operating parameter in group of operating parameters 130 may be a threshold, a range, or some other type of parameter. The operating parameter may define a constraint or desired operating range or condition.

Group of operating conditions 128 may take various forms. For example, group of operating conditions 128 may include at least one of a motor load, a rate of change of temperature for the group of switches, a temperature of the motor, a temperature of a stator in the motor, or other suitable operating conditions relating to the operation of electric motor 104. Examples of other operating conditions in group of operating conditions 128 may be humidity, airflow rate, coolant flow rate, and other suitable conditions.

As depicted, frequency identifier 120 also may use group of operating parameters 130 in information 118. Group of operating parameters 130 may include, for example, at least one of a maximum temperature for the electric motor, or a desired temperature for the group of switches, or other suitable parameters.

Frequency identifier 120 may select switching frequency 114. The receiving of information 118 and selecting of switching frequency 114 may occur dynamically during operation of electric motor 104. Additionally, the selection of switching frequency 114 may be made to the operation of electric motor 104 using information 118 that has been collected previously from the operation of electric motor 104.

Frequency controller 122 is configured to control switching of switches 124. Frequency controller 122 uses switching frequency 114 identified by frequency identifier 120.

As depicted, switches 124 switch between on and off positions to control the flow of current 112 from power supply 106 to electric motor 104. In particular, switches 124 is configured to be controlled by frequency controller 122 in controller 108 to switch at switching frequency 114 when sending current 112 to electric motor 104. In particular, controller 108 may take the form of an impulse width modulation controller (IWMC) that modulates switching frequency 114 used to drive switches 124 in the form of transistors that control current 112 sent to electric motor 104. Current 112 may be used to control the voltage across electric motor 104.

In the illustrative examples, switching frequency 114 is not the same frequency as those used to control the speed of electric motor 104. Switching frequency 114 is higher than the frequencies used to control speeds of electric motor 104.

For example, switching frequency 114 may be about 20 kHz in one non limiting example. With switching frequency 114, 12,000K switchings occur each minute. On the other hand, the revolutions per minute of electric motor 104 may be, for example, 7000 rpm. As can be seen, switching frequency 114 is typically higher than the rotations of electric motor 104. As a result, the rotation speed of electric motor 104 may not be affected by switching frequency 114 due to the difference between switching frequency 114 and the rotation of electric motor 104. In this example, switching frequency 114 may be selected such that switching frequency 114 does not affect the rotation of electric motor 104. Instead, switching frequency 114 may be selected to control electric current in windings within electric motor 104. The switching of current may be used to control the amplitude of the current through different windings within electric motor 104 causing electric motor 104 to rotate.

In these illustrative examples, sensor system 132 may detect and send group of operating conditions 128. Group of operating conditions 128 may be sent as part of information 118 to controller 108. Sensor system 132 is configured to detect group of operating conditions 128 relating to the operation of electric motor 104.

As depicted, sensor system 132 may include a group of sensors. A sensor in the group of sensors for sensor system 132 may take various forms. For example, the sensor may be selected from at least one of a thermocouple, a current sensor, a voltage sensor, a thermistor, or other suitable devices.

Further, in this illustrative example, controller 108 may receive information 118 in two parts. For example, controller 108 may receive heat generated by electric motor 104 in group of operating conditions 128 in information 118. Controller 108 may receive heat generated by controller 108 in group of operating conditions 128 in information 118. With these two pieces of information 118, controller 108 may select switching frequency 114 in a manner that balances heat generated by controller 108 and electric motor 104 in some illustrative examples. Thus, a balance may be made between decreasing heat in one of these components and increasing heat in the other component.

The illustration of electric motor environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, sensor system 132 may be part of electric motor system 102 instead of a separate component as illustrated. In another illustrative example, controller 108, although shown in a separate block from electric motor 104, may be integrated as part of electric motor 104.

Figure 2:
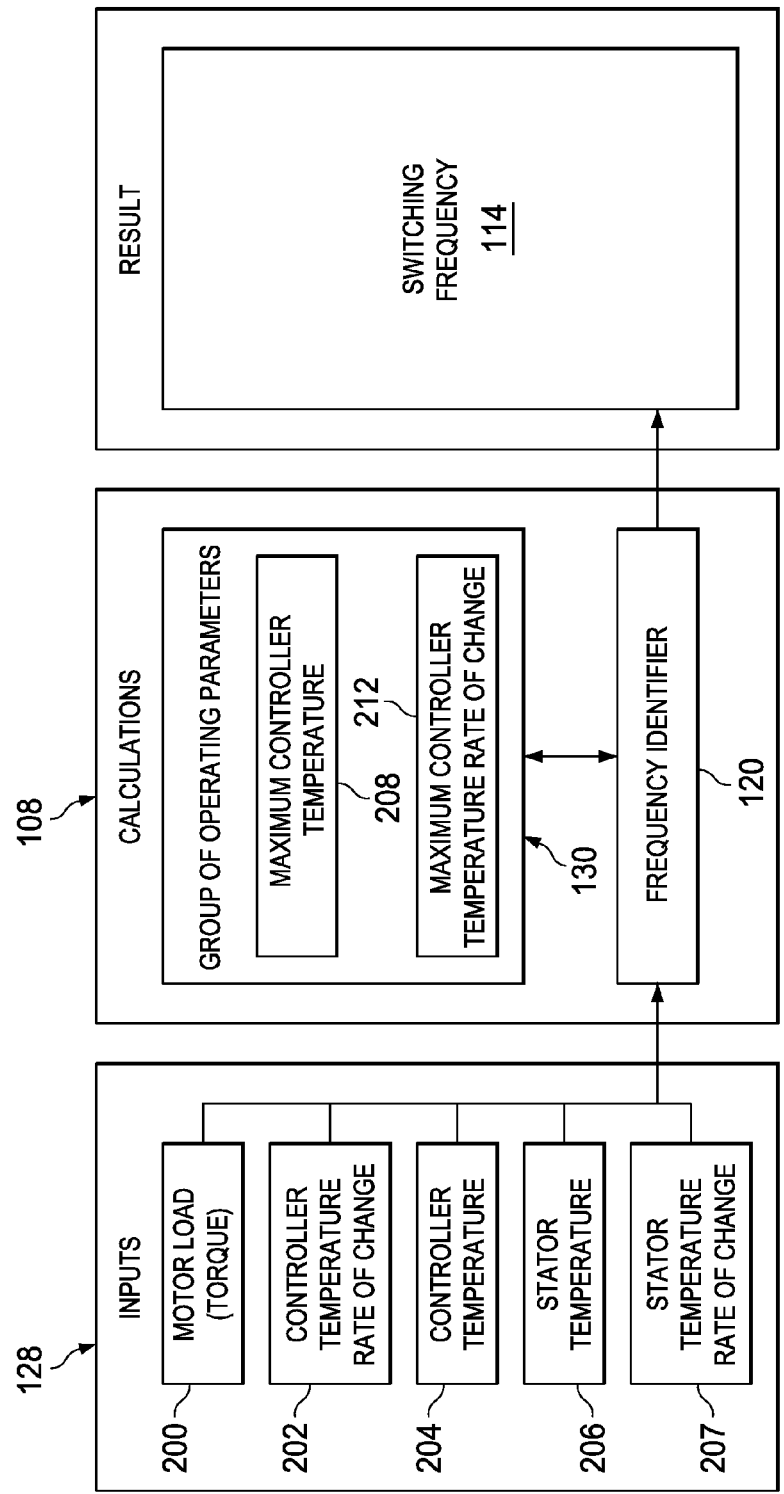
FIG. 2 is an illustration of an identification of a switching frequency in accordance with an illustrative embodiment.

With reference next to FIG. 2, an illustration of an identification of a switching frequency is depicted in accordance with an illustrative embodiment. In this illustrative example, frequency identifier 120 in controller 108 receives group of operating conditions 128 as an input to identify switching frequency 114. As depicted, group of operating conditions 128 includes motor load 200, controller temperature rate of change 202, controller temperature 204, stator temperature 206, and stator temperature rate of change 207 as inputs to identify switching frequency 114.

As depicted, motor load 200 is a torque generated by electric motor 104 in response to a load. Controller temperature rate of change 202 is the change in temperature of switches 124. Controller temperature 204 is the temperature of switches 124. Stator temperature 206 is the temperature of one or more stators in electric motor 104. In these illustrative examples, these operating conditions in group of operating conditions 128 may be directly measured or inferred from indirect measurements. For example, thermocouples may be used to measure temperature and changes in temperature. As another example, the temperature and changes in temperature may be indirectly inferred from measuring current sent to electric motor 104 or switching frequency 114 for switches 124.

With these four operating conditions, frequency identifier 120 may perform calculations to identify switching frequency 114 as a result of the calculations during the operation of electric motor 104. As group of operating conditions 128 change, switching frequency 114 may be changed to improve group of operating conditions 128 for electric motor 104 or other components in electric motor system 102 or electric motor environment 100. In other words, switching frequency 114 may be changed to change group of operating conditions 128 to increase towards or meet group of desired operating conditions 116. In this illustrative example, group of operating conditions 128 may be at least one of a temperature of electric motor 104, controller 108, or some other operating condition.

In these illustrative examples, the improvement in group of operating conditions 128 may be a reduction in the temperature of at least one of electric motor 104 or controller 108. This reduction may result in improvements in the efficiency in which electric motor system 102 operates. The improvement in efficiency may be an increase in the lifespan of at least one of electric motor 104 or controller 108.

In this illustrative example, controller temperature 204 and controller temperature rate of change 202 may be used to identify the limits to switching frequency 114. For example, group of operating parameters 130 may include maximum controller temperature 208. Frequency identifier 120 may identify a value for switching frequency 114. Although this value may be the best value for switching frequency 114, the value may not be used for switching frequency 114 if that value causes controller temperature 204 to exceed maximum controller temperature 208.

In some illustrative examples, controller 108 may be cooled. The cooling may occur using a heat transfer system that may be passive or active. As a result, the cooling may allow for higher values for switching frequency 114 to avoid maximum controller temperature 208.

Further, in these illustrative examples, an additional step may be used to prevent overheating of controller 108. For example, controller temperature rate of change 202 may be used to determine whether the temperature increase of controller 108 is at a rate that is greater than desired. Maximum controller temperature 208 and maximum controller temperature rate of change 212 are group of operating parameters 130. The use of these operating parameters may reduce the possibility that controller temperature 204 may overshoot or pass maximum controller temperature 208.

In this manner, frequency identifier 120 may identify switching frequency 114 in a manner that increases the efficiency of electric motor system 102. This efficiency may be used to control stator temperature 206 as well as controller temperature 204.

For example, switching frequency 114 may be increased to reduce heat generated by stators in electric motor 104. This change in switching frequency 114 may be performed temporarily to decrease heat generated by the stators and provide for cooling in electric motor 104. This increase may be performed so long as controller 108 is able to withstand the increase in heat generated by the increase in switching frequency 114.

Further, the different illustrative examples may identify switching frequency 114 during the operation of electric motor 104. This identification of switching frequency 114 may result in switching frequency 114 changing during operation of electric motor 104. The change in switching frequency 114 may occur in response to changes in electric motor environment 100. For example, temperature changes in electric motor environment 100 may occur resulting in changes in the manner in which at least one of electric motor 104 or controller 108 may generate heat and increase in temperature.

For example, electric motor system 102 may be used in an aircraft. As the aircraft changes altitude, the temperature in electric motor environment 100 may change. As a result, switching frequency 114 also may change, taking into account the changes in temperature in electric motor environment 100 when electric motor system 102 is used in an aircraft. As another example, the operation of other devices in electric motor environment 100 also may change the temperature around electric motor 104. This change in temperature also may affect the identification of switching frequency 114.

In this manner, switching frequency 114 may be changed dynamically in response to changes in electric motor environment 100. These changes may be performed to maintain a desired level performance for electric motor 104 based on group of desired operating conditions 116.

Although specific examples of group of operating conditions 128 and group of operating parameters 130 have been shown, other operating conditions and operating parameters may be used in addition to or in place of the ones depicted in this figure.

The illustration of electric motor environment 100 and the different components in FIG. 1 and FIG. 2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, sensor system 132 may be part of electric motor system 102 instead of a separate component as illustrated. In another illustrative example, controller 108, although shown in a separate block from electric motor 104, may be integrated as part of electric motor 104.

As another example, although controller 108 is described as being implemented using an impulse width modulation controller (IWMC) in the illustrative example, controller 108 may be implemented in other ways. For example, controller 108 may also be implemented using pulse width modulation (PWM) controllers.

Figure 3:
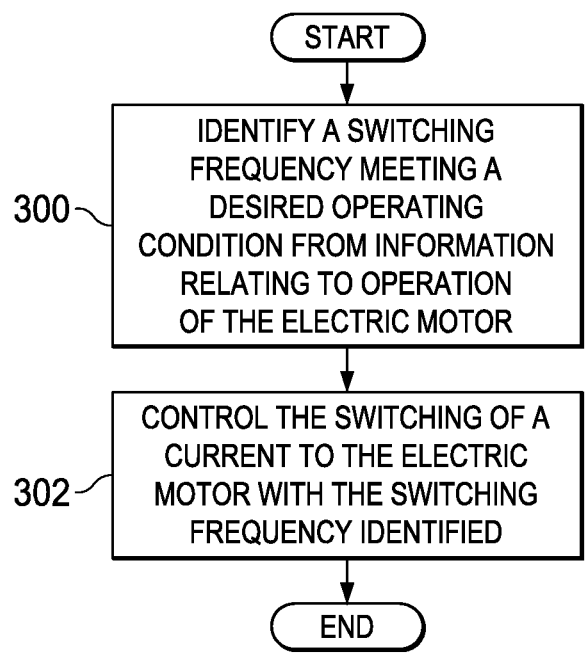
FIG. 3 is an illustration of a flowchart of a process for controlling an electric motor in accordance with an illustrative embodiment.

With reference now to FIG. 3, an illustration of a flowchart of a process for controlling an electric motor is depicted in accordance with an illustrative embodiment. The process illustrated in FIG. 3 may be implemented in controller 108 in FIG. 1.

The process begins by identifying a switching frequency meeting a desired operating condition from information relating to operation of the electric motor (operation 300). In these illustrative examples, the operating condition may be a maximum motor temperature. In some illustrative examples, additional operating conditions may be considered. For example, a maximum controller temperature also may be considered as part of a group of desired operating conditions when more than one operating condition is considered.

Additionally, operation 300 may be performed prior to operating the electric motor from prior information identified for the electric motor. In other illustrative examples, operation 300 also may be performed while the motor is operating. In this manner, an indication of the switching frequency may occur such that the switching frequency may change as information relating to the operation of the electric motor changes.

The process then controls the switching of a current to the electric motor with the switching frequency identified (operation 302), with the process terminating thereafter.

Figure 4:
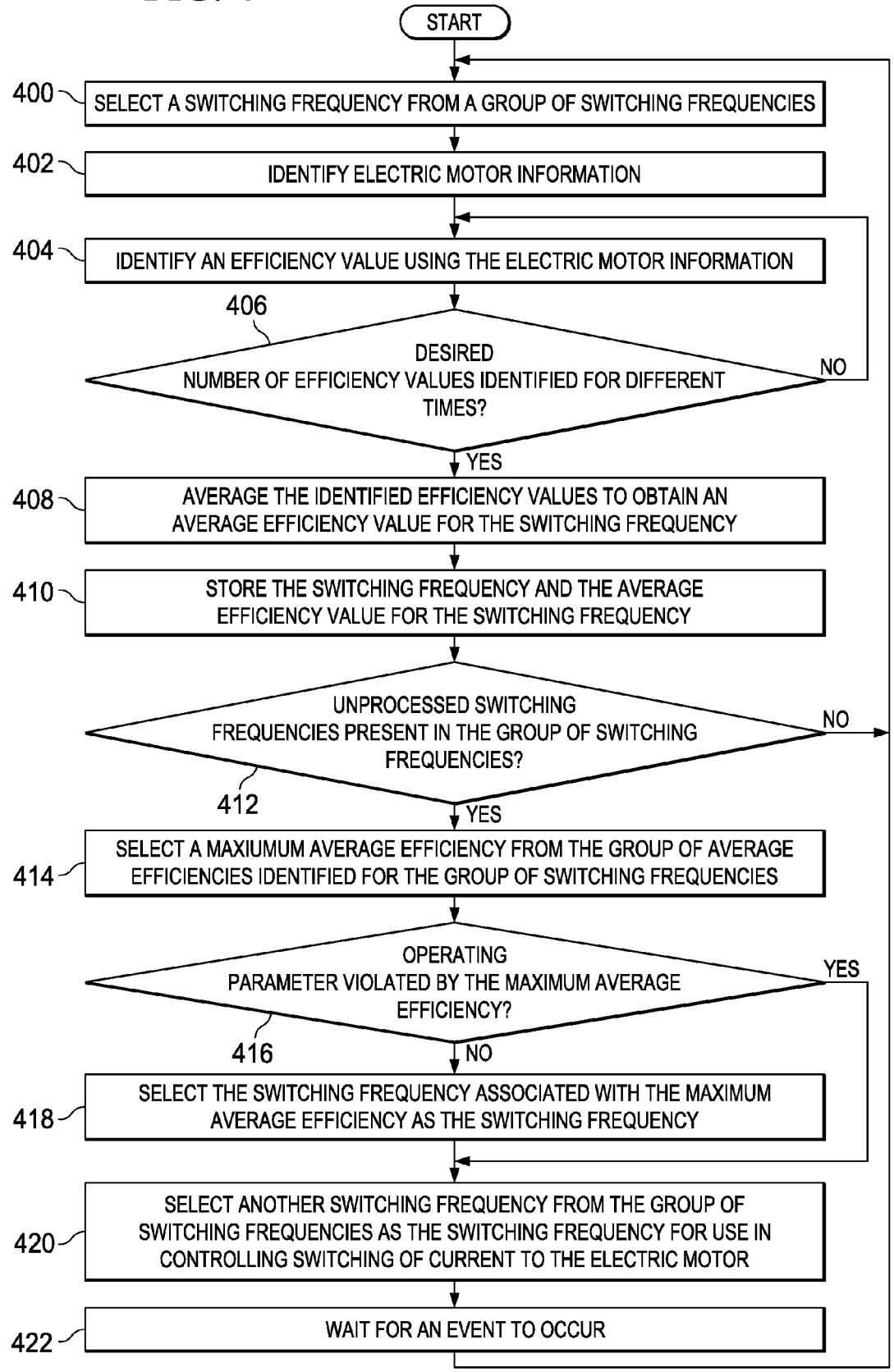
FIG. 4 is an illustration of a flowchart of a process for identifying a switching frequency in accordance with an illustrative embodiment.

Turning next to FIG. 4, an illustration of a flowchart of a process for identifying a switching frequency is depicted in accordance with an illustrative embodiment. The process illustrated in FIG. 4 is an example of one manner in which operation 300 may be implemented.

The process in this illustrative example may be used to identify a desired switching frequency. The process illustrated in this example uses a frequency sweep in which a group of switching frequencies are used to identify the efficiencies of the electric motor for different switching frequencies in the group of switching frequencies selected. In particular, the different operations described in FIG. 3 provide for an empirical process that then identifies efficiency versus switching frequency that may be used to identify a desired switching frequency.

The process begins by selecting a switching frequency from a group of switching frequencies (operation 400). The group of switching frequencies may be a range of frequencies through which the process may sweep in these illustrative examples. For example, the group of frequencies may be from about 20 kHz to about 80 kHz in which the step size is about 10 kHz. This range of frequencies form the group of switching frequencies used in the frequency sweep. In this illustrative example, the switching frequency may begin at the lower end of the range, such as 20 kHz.

The process then identifies electric motor information (operation 402). In these illustrative examples, the electric motor information may be, for example, input voltage, input current, revolutions per minute, and torque for the electric motor.

The process then identifies an efficiency value using the electric motor information (operation 404). In the illustrative example, the efficiency value for the electric motor may be identified as follows:

$$e = \frac{\tau \omega}{V_{in} i_{in}}$$

where e is efficiency, $\tau$ is torque of the electric motor, $\omega$ is revolutions per minute of the electric motor, $V_{in}$ is voltage input to the electric motor, and $i_{in}$ is current input to the electric motor.

The efficiency identified in operation 404 is an instantaneous efficiency. In other words, the efficiency is for a particular point in time.

A determination is made as to whether a desired number of efficiency values have been identified for different times (operation 406). In this illustrative example, the period of time over which the samples are taken and averaged may be, for example, about one second. Of course, other time periods may be used such as about 0.5 seconds, about 3.0 seconds, or some other suitable period of time. If the desired number of efficiency values have not been identified, the process returns to operation 404.

Otherwise, the process then averages the identified efficiency values to obtain an average efficiency value for the switching frequency (operation 408). The switching frequency and the average efficiency value for the switching frequency are stored (operation 410).

A determination is made as to whether unprocessed switching frequencies are present in the group of switching frequencies (operation 412). If another switching frequency is present that has not been processed, the process returns to operation 400.

When all of the switching frequencies in the group of switching frequencies have been processed, a group of average efficiencies is identified for the group of switching frequencies. The process then selects a maximum average efficiency from the group of average efficiencies identified for the group of switching frequencies (operation 414). At this point in operation 414, a profile for average efficiencies for the group frequencies is present. This profile is for a period of time that is substantially close to the current time during which the electric motor is operating. The maximum average efficiency is selected from this profile in operation 414.

The selection of the switching frequency from a highest average efficiency in the group of average efficiencies may be subject to the violation of an operating parameter. A determination is made as to whether an operating parameter is violated by the maximum average efficiency (operation 416). The operating parameter may be an operating parameter in group of operating parameters 130.

In operation 416, the switching frequency associated with the maximum average efficiency may be used to determine whether an operating parameter such as a maximum motor temperature, a maximum controller temperature, or some other condition specified by the operating parameter is exceeded when using the switching frequency.

For example, higher switching frequencies may cause a controller for the electric motor to heat up more quickly as compared to lower switching frequencies. Further, the higher switching frequencies may allow stators in an electric motor to cool more quickly than lower switching frequencies. The operating parameter may designate a threshold or range of values that may limit how high the switching frequency may be.

If an operating parameter is not violated, the process selects the switching frequency associated with the maximum average efficiency as the switching frequency (operation 418). The process then selects another switching frequency from the group of switching frequencies as the switching frequency for use in controlling switching of current to the electric motor (operation 420). With reference again to operation 416, if an operating parameter is violated, the process also proceeds to operation 420 as described above. In operation 420, the switching frequency may be a switching frequency for the next highest average efficiency that does not violate the operating parameter. The switching frequency for this next highest average efficiency may be used until the violation of the operating parameter is no longer present. This determination may be made on the next sweep of the switching frequencies.

The process then waits for an event to occur (operation 422). The process then returns to operation 400 after the event occurs. In these illustrative examples, the event may take different forms. For example, the event may be a periodic event or non-periodic event.

A periodic event may be a passage of a selected amount of time. The time period may be, for example, two minutes, five minutes, seven minutes, or some other time period. With this passage of time, switching frequencies previously selected may expire or no longer be used. At this point, new switching frequencies may be identified. In this manner, the average efficiencies for the group of switching frequencies may be refreshed to have a current profile that may reflect operating conditions currently encountered by the motor system.

A non-periodic event may be, for example, a change in temperature, a change in the load on the electric motor, an operator-initiated event, a change in operating condition that is greater than a threshold, or some other suitable type of event. For example, a non-periodic event may be a change in operating condition that exceeds a threshold or falls outside of the range.

Of course, other techniques may be used to identify a switching frequency. Instead of making measurements, models and simulations also may be used to identify optimal switching frequencies for different operating conditions. Additionally, although a range from about 20 kHz to about 80 kHz is shown in this particular example, other ranges of frequencies may be used to control the switching of current to the electric motor by switches in the controller. The particular frequencies or range of frequencies may depend on the particular components. For example, different frequencies may be more suitable for some types of motors and their applications as opposed to others. Additionally, other factors also may affect the frequencies used. For example, the types of switches or other components in the controller also may be used as a factor in selecting particular frequencies or a range of frequencies.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

With reference now to FIG. 5, an illustration of a table of rules for handling operating parameters is depicted in accordance with an illustrative embodiment. In this illustrative example, table 500 is a policy in the form of rules for managing a violation of operating parameters. In particular, the switching frequency may be identified from a highest average efficiency in the group of average efficiencies subject to violation of a rule for an operating parameter.

In this illustrative example, table 500 includes rule 502, rule 504, rule 506, and rule 508. In this illustrative example, table 500 includes operating parameter column 513, constraint column 514 and action column 516 for the rules. In this illustrative example, rule 502, rule 504, rule 506, and rule 508 may be applied to a range of switching frequencies from about 20 kHz to about 80 kHz.

In rule 502, the operating parameter is maximum stator temperature. The constraint is violated for rule 502 in this example when the maximum stator temperature has been exceeded. When the maximum stator temperature has been exceeded, the action is to set the switching frequency to about 40 kHz in this illustrative example.

In table 500, rule 504 is for the operating parameters comprising maximum stator temperature increase rate and maximum stator temperature. The constraint on these parameters is violated when the maximum stator temperature increase rate has been exceeded and the maximum stator temperature is at least 90 percent. When rule 504 is invoked, the action is to set the switching frequency to about 40 kHz.

Next, in rule 506, the operating parameter is maximum controller temperature. The constraint for this operating parameter is violated when the maximum controller temperature has been exceeded. The switching frequency is set to about 20 kHz as the action taken in this rule.

In the illustrative example, in rule 508, the operating parameters are maximum controller temperature increase rate and maximum controller temperature. The constraint on these parameters is violated when the maximum controller temperature increase rate has been exceeded and the maximum controller temperature is at least 90 percent. In this example, the action is to set the switching frequency to about 20 kHz.

The illustration of rules in table 500 in FIG. 5 is not meant to limit the manner in which other rules may be implemented. Further, although specific values have been shown as examples of values for switching frequencies, other values may be used for switching frequencies other than those illustrated in this figure. In different implementations, the values selected for switching frequencies may be selected as ones that provide a desired operating condition when constraints of some operating parameters are violated. In other illustrative examples, rules may be used only with respect to operating conditions for the electric motor. In still other illustrative examples, rules also may include those with respect to other devices that may be affected by heat generated by at least one of the controller or the electric motor. Of course, the rules may take into account any conditions, constraints, parameters, or other factors that may be of interest in managing the operation of the electric motor system.

Figures 6, 7:
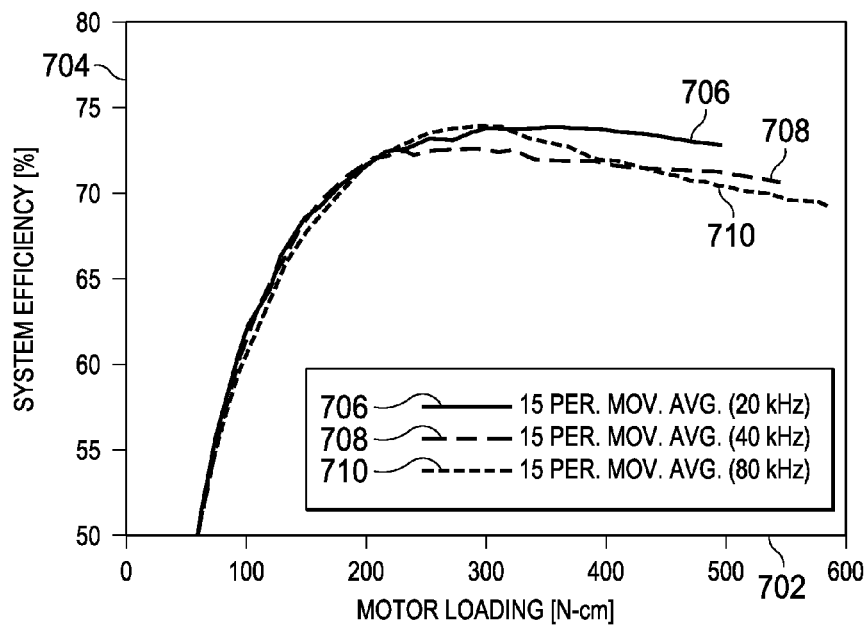
FIG. 6 is an illustration of a table of events that may be used to restart the identification of a switching frequency.
FIG. 7 an illustration of a graph of system efficiency for different motor loadings in accordance with an illustrative embodiment.

With reference next to FIG. 6, an illustration of a table of events that may be used to restart the identification of a switching frequency is depicted in accordance with an illustrative embodiment. In this illustrative example, table 600 identifies examples of events that may result in re-initiating the process in FIG. 4.

In this illustrative example, table 600 includes entry 602 and entry 604. Entry 602 indicates that a sweep of frequencies to identify a switching frequency is to be performed when the event is a constraint for the revolutions per minute to increase or decrease by 10 percent since the last time a switching frequency was identified. Entry 604 indicates that the frequency should be re-identified by performing a frequency sweep as describe above when the event is the torque increasing or decreasing by at least 10 percent since the last identification of the switching frequency.

Of course, the illustration of the events in entry 602 and entry 604 are examples of some events that may be used to restart the process of identifying a switching frequency. Of course, other types of events may be used depending on the particular implementation. For example, an event may be used if the temperature of other devices within a selected distance of the electric motor is a temperature greater than some threshold. As another example, the event may be the expiration of the time period, which results in identifying the switching frequency again through the sweeping process described above.

Turning next to FIG. 7, an illustration of a graph of system efficiency for different motor loadings is depicted in accordance with an illustrative embodiment. In graph 700, X axis 702 is motor loading in N-cm. As depicted, y-axis 704 is system efficiency for the electric motor system as a percentage.

In this illustrative example, the system efficiency may be defined as the heating that occurs in at least one of the controller and the electric motor. The system efficiency goes down as the temperature of at least one of the controller and the electric motor increases. In this particular example, the efficiency of the motor system is calculated using the power out divided by the power in. The efficiency, in this particular example, is directly affected by heat. As more heating occurs, more power is dissipated in the form of heat rather than used to perform work.

In this illustrative example, line 706 represents system efficiency for a switching frequency of about 20 kHz. Line 708 represents a system efficiency for a switching frequency of about 40 kHz. Line 710 represents system efficiency for a switching frequency of about 80 kHz. The data represented by these lines is generated using a 2 hp ring motor in the illustrative example.

As depicted, a lower switching frequency results in a higher system efficiency as compared to a higher switching frequency. This difference in system efficiency may occur at about 200 N-cm in this example. For example, the faster switching frequency in line 710 may result in a lower system efficiency as compared to a lower switching frequency, depending on the load placed upon the electric motor. As a result, as the motor loading changes, the switching frequency may be lowered to a lower switching frequency, such as 20 kHz, to provide a higher system efficiency as compared to a higher switching frequency, such as 80 kHz.

By sweeping through the different frequencies, an identification of switching frequencies that may be more efficient than lower switching frequencies may be made. For example, in graph 700 in FIG. 7, about 20 kHz is the most efficient switching frequency as can be seen by line 706 at higher loads, such as those above 300 N-cm. An intermediate range, such as from about 200 N-cm to about 300 N-cm 80 kHz, may be a better selection for the switching frequency as can be seen by line 710.

By changing the switching frequency as the load changes, the efficiency of the motor system may be maintained at higher levels as opposed to using static switching frequencies. In this manner, the efficiency of an electric motor system implemented in accordance with an illustrative embodiment may be increased as compared to currently used electric motor systems.

Figure 8:
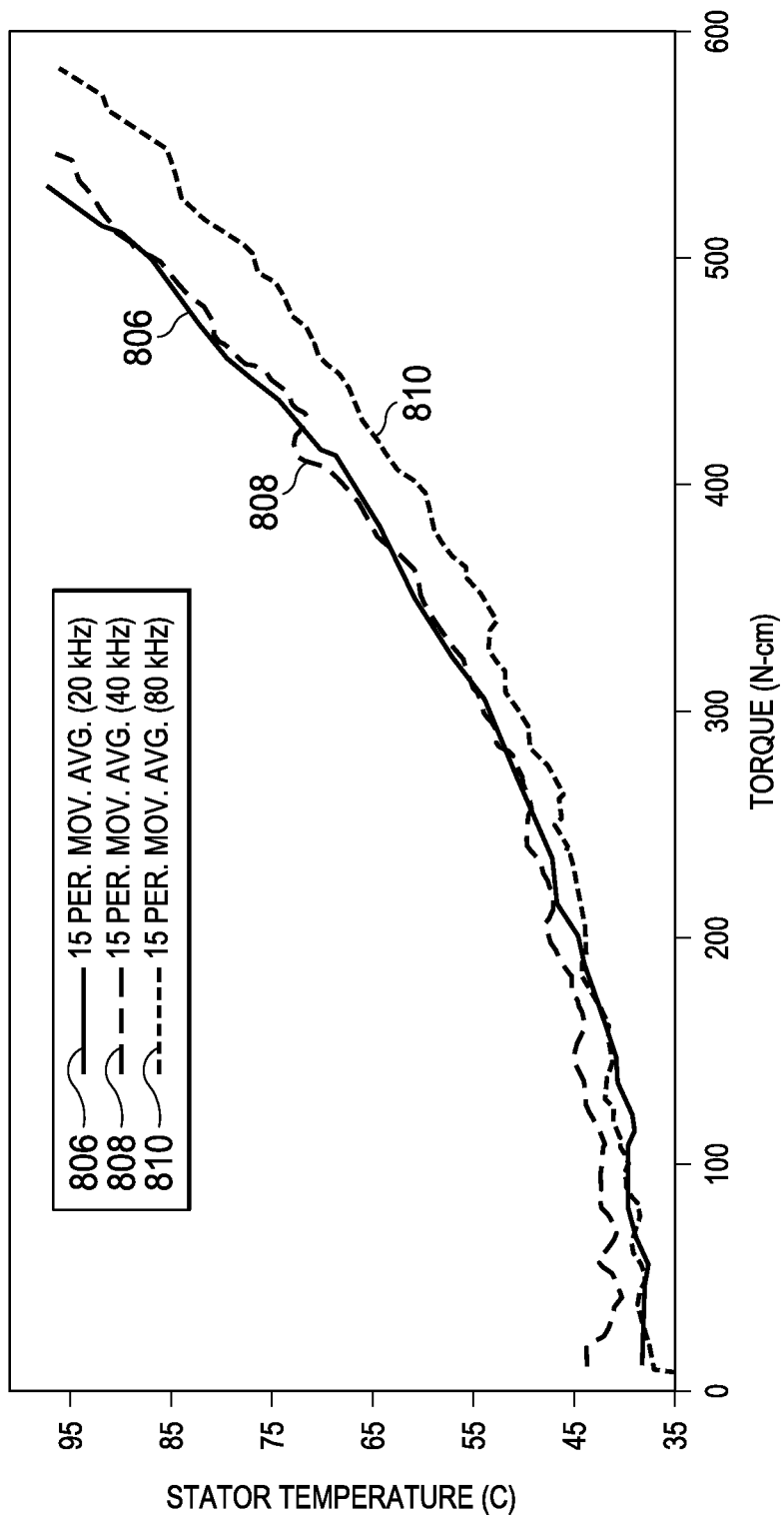
FIG. 8 is an illustration of a graph of stator temperature for an electric motor for different amounts of torque in accordance with an illustrative embodiment.

Turning next to FIG. 8, an illustration of a graph of stator temperature for an electric motor for different amounts of torque is depicted in accordance with an illustrative embodiment. In graph 800, X axis 802 is torque in N-cm. As depicted, y-axis 704 is stator temperature in C.

In this illustrative example, line 806 represents stator temperature for a switching frequency of about 20 kHz. Line 808 represents a stator temperature for a switching frequency of about 40 kHz. Line 810 represents a stator temperature for a switching frequency of about 80 kHz. The data represented by these lines is generated using a 2 hp ring motor in the illustrative example.

As can be seen in this example, higher switching frequencies result in a lower stator temperature for different torque levels. For example, with a torque of about 500 N-cm, the stator temperature at about 80 kHz is lower than that of about 20 kHz or about 40 kHz.

In these illustrative examples, lower heat generation may occur from decreased eddy currents dissipation in the iron poles of the stator. Increasing the switching frequency results in a decrease in eddy currents in the electric motor. As a result, the temperature also may decrease in the electric motor.

With the higher switching frequencies, the heat generation increases in the controller. This increase in heat generation occurs because more heat is generated from increased switching losses. As a result, a balance may be made between the heat generated by the controller and the electric engine. In this manner, the distribution of the heat generated and displayed may be distributed between the controller and the electric motor in the different illustrative examples.

Illustrative embodiments of the disclosure may be described in the context of aircraft manufacturing and service method 900 as shown in FIG. 9 and aircraft 1000 as shown in FIG. 10. Turning first to FIG. 9, an illustration of an aircraft manufacturing and service method is depicted in the form of a block diagram in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 in FIG. 10 takes place. Thereafter, aircraft 1000 in FIG. 10 may go through certification and delivery 910 in order to be placed in service 912. While in service 912 by a customer, aircraft 1000 in FIG. 10 is scheduled for routine maintenance and service 914, which may include modification, reconfiguration, refurbishment, and other maintenance or service.

Each of the processes of aircraft manufacturing and service method 900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of an aircraft is depicted in the form of a block diagram in which an illustrative embodiment may be implemented. In this example, aircraft 1000 is produced by aircraft manufacturing and service method 900 in FIG. 9 and may include airframe 1002 with systems 1004 and interior 1006. Examples of systems 1004 include one or more of propulsion system 1008, electrical system 1010, hydraulic system 1012, and environmental system 1014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 900 in FIG. 9.

In one illustrative example, components or subassemblies produced in component and subassembly manufacturing 906 in FIG. 9 may be fabricated or manufactured in a manner similar to components or subassemblies produced while aircraft 1000 is in service 912 in FIG. 9. As yet another example, one or more apparatus embodiments, method embodiments, or a combination thereof may be utilized during production stages, such as component and subassembly manufacturing 906 and system integration 908 in FIG. 9. One or more apparatus embodiments, method embodiments, or a combination thereof may be utilized while aircraft 1000 is in service 912 and/or during maintenance and service 914 in FIG. 9. The use of a number of the different illustrative embodiments may substantially expedite the assembly of and/or reduce the cost of aircraft 1000.

In one illustrative example, components or subassemblies produced in component and subassembly manufacturing 906 in FIG. 9 may be fabricated or manufactured in a manner similar to components or subassemblies produced while aircraft 1000 is in service 912 in FIG. 9. For example, electric motor systems may be manufactured for use in aircraft during one or more of these different stages.

As yet another example, one or more apparatus embodiments, method embodiments, or a combination thereof may be utilized during production stages, such as component and subassembly manufacturing 906 and system integration 908 in FIG. 9. As another example, during in service 912, one or more illustrative embodiments may be implemented to control the operation of electric motors in a manner that increases the efficiency of electric motors. One or more apparatus embodiments, method embodiments, or a combination thereof may be utilized while aircraft 1000 is in service 912 and/or during maintenance and service 914 in FIG. 9. The use of a number of the different illustrative embodiments may substantially expedite the assembly of and/or reduce the cost of aircraft 1000.

Thus, the illustrative embodiments provide a method and apparatus for controlling an electric motor system. In the different illustrative examples, the switching frequency of the electric motor may be controlled in a manner that reduces the operating temperature at which the electric motor operates. Further, different illustrative examples take into account that changes in operating conditions such as the temperature in the environment around the electric motor also may be taken into account in selecting a switching frequency.

In this manner, the operating efficiency of the electric motor may be increased for various operating conditions. For example, the switching frequency may be controlled to manage heat dissipation in a manner that reduces overheating in various operating conditions.

In the illustrative examples, the controller is configured to change the switching frequency as a function of various operating conditions such as load, controller temperature, controller temperature rate of change, stator temperature, and other operating conditions. With this information, switching frequencies may be selected to increase the efficiency of the motor system. Additionally, heating of the controller also may be taken into account to reduce overheating of the controller with the use of increasing the higher switching frequencies.

Further, controller 108 in electric motor system 102 also may provide other features through changing switching frequency 114 for electric motor 104. For example, changing switching frequency 114 may reduce electronic signatures that may be generated by electric motor 104. This may be especially useful in aircraft in which reducing electronic signatures may be important for a mission.

In one illustrative example, the aircraft may be an unmanned aerial vehicle (UAV). Reducing the electrical signature of motors and actuators may make the unmanned air vehicle harder to detect and track.

Another application may include selecting frequencies as low as possible for cooling. These frequencies, however, may be heard by a person in the vicinity of the electric motors. For example, on an aircraft, actuators may be heard when these switching frequencies are lower. This lower switching frequency may be selected to maintain lower temperatures for the motor controllers. The switching frequency may be used during a phase of flight when other noise may mask the sound generated by the switching frequency. The higher switching frequency may be selected for other phases of flight when less noise is present in the aircraft. Further, the selection of the switching frequency also may depend on where passengers or crew members may or may not be located.

As still another example, an illustrative embodiment may be implemented to reduce sound generated by a ship such as a submarine. Switching frequency 114 may be selected to reduce the signature of the summary. The signature may include both electromagnetic signatures and audible signatures for the submarine.

Additionally, although the illustrative examples have been described with respect to selecting switching frequency 114 for efficiency as group of desired operating conditions 116, switching frequency 114 may be selected for any other reasons. For example, switching frequency 114 may be selected for increasing the power or torque generated by electric motor 104 rather than maximum efficiency.

This type of selection of switching frequency 114 may be especially useful in a vehicle such as an automobile with electric motors. When power is needed more than efficiency, switching frequency 114 may be selected based on that desired operating condition. As a result, switching frequency 114 may be selected and switched based on changing desired operating conditions. For example, power may be needed for acceleration, while efficiency may be needed for cruising.

The description of the different illustrative embodiments has been presented for purposes of illustration and description, and is not intended to be exhaustive or limited to the embodiments in the form disclosed. Many modifications and variations will be apparent to those of ordinary skill in the art.

For example, although the illustrative examples have been described with respect for use of electric motors in an aircraft, the different illustrative examples may be implemented in other platforms. For example, an illustrative embodiment may be applied to other types of platforms. The platform may be, for example, a mobile platform, a stationary platform, a land-based structure, an aquatic-based structure, and a space-based structure. More specifically, the platform may be a surface ship, a tank, a personnel carrier, a train, a spacecraft, a space station, a satellite, a submarine, an automobile, electric vehicle, a hybrid vehicle, an electric aircraft, a hybrid aircraft, a power plant, a bridge, a dam, a house, a manufacturing facility, a building, and other suitable platforms.

Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a controller configured to identify a switching frequency meeting a desired operating condition from information relating to operation of an electric motor and control switching of a current supplied to the electric motor with the switching frequency identified;
   wherein the switching frequency is identified based on a motor load, a controller temperature, a controller temperature rate of change, a stator temperature, and a stator temperature rate of change.

2. The apparatus of claim 1, wherein the controller is configured to change the switching frequency dynamically during operation of the electric motor.

3. The apparatus of claim 2, wherein the switching frequency changes in response to changes in operating conditions for the electric motor.

4. The apparatus of claim 1, wherein the controller comprises:
   a frequency identifier configured to receive the information relating to operation of the electric motor and identify the switching frequency meeting the desired operating condition from the information received; and
   a frequency controller configured to control switching of the current supplied to the electric motor with the switching frequency identified.

5. The apparatus of claim 4, wherein the controller further comprises:

a group of switches connected to the frequency controller, wherein the group of switches is configured to switch at the switching frequency when sending the current to the electric motor.

6. The apparatus of claim 1 further comprising:
a sensor system configured to generate the information.

7. The apparatus of claim 4, wherein the information comprises a group of operating conditions selected from at least one of a motor load, a rate of change of temperature for the group of switches, a temperature of the electric motor, or a temperature of a stator in the electric motor.

8. The apparatus of claim 1, wherein the controller is configured to identify the information relating to operation of the electric motor and identify the switching frequency meeting the desired operating condition for the electric motor from the information in response to an event.

9. The apparatus of claim 8, wherein the event is selected from one of a periodic event, a non-periodic event, a change in temperature, a change in load on the electric motor, or an operator-initiated event.

10. The apparatus of claim 1, wherein the desired operating condition is selected from at least one of efficiency or power.

11. The apparatus of claim 1, wherein the controller is configured to identify the switching frequency meeting the desired operating condition for the electric motor from the information received based on an identification of efficiency of the electric motor as follows:

$$e = \frac{\tau \omega}{V_{in} i_{in}}$$

where e is efficiency, τ is torque of the electric motor, ω is revolutions per minute, $V_{in}$ is voltage input to the electric motor, and $i_{in}$ is current input to the electric motor.

12. The apparatus of claim 1, wherein the electric motor is a brushless electric motor.

13. An electric motor system comprising:
an electric motor; and
a controller configured to:
    receive information relating to heat generated by an operation of the electric motor;
    identify a switching frequency meeting a desired operating temperature from the information relating to the heat generated by the operation of the electric motor; and
    control switching of a current supplied to the electric motor with the switching frequency identified;
    wherein the switching frequency is identified based on a motor load, a controller temperature, a controller temperature rate of change, a stator temperature, and a stator temperature rate of change.

14. A method for controlling an electric motor comprising:
identifying a switching frequency meeting a desired operating condition from information relating to operation of the electric motor; and
controlling switching of a current supplied to the electric motor with the switching frequency identified;
wherein the switching frequency is identified based on a motor load, a controller temperature, a controller temperature rate of change, a stator temperature, and a stator temperature rate of change.

15. The method of claim 14, wherein the identifying step and the controlling step are dynamically performed during operation of the electric motor.

16. The method of claim 15, wherein the switching frequency changes in response to changes in operating conditions for the electric motor.

17. The method of claim 14, wherein the identifying step and the controlling step are performed by a controller for the electric motor.

18. The method of claim 14, wherein the information is selected from at least one of a motor load, a rate of change of temperature for a group of switches, a temperature of the electric motor, a temperature of a stator in the electric motor, a maximum temperature for the electric motor, or a desired temperature for the group of switches.

19. The method of claim 14, wherein the identifying step comprises:
identifying the switching frequency meeting the desired operating condition for the electric motor from the information received based on an identification of efficiency of the electric motor as follows:

$$e = \frac{\tau \omega}{V_{in} i_{in}}$$

where e is efficiency, τ is torque of the electric motor, ω is revolutions per minute, $V_{in}$ is voltage input to the electric motor, and $i_{in}$ is current input to the electric motor.

20. The method of claim 14, wherein the identifying step comprises:
identifying a group of average efficiencies for a group of switching frequencies; and
identifying the switching frequency from a highest average efficiency in the group of average efficiencies subject to violation of a rule for an operating parameter.

* * * * *